Patented Dec. 24, 1946

2,413,050

UNITED STATES PATENT OFFICE 2,413,050

ALKYL SILICON CHLORIDES AND THEIR PREPARATION

James Franklin Hyde, Corning, N. Y., assignor to Corning Glass Works, Corning, N. Y., a corporation of New York No Drawing. Application April 21, 1945, Serial No. 589,689

5 Claims. (Cl. 260—607)

This invention relates to new compositions of matter and their preparation and, more particularly, to organo-silicon chlorides and methods of preparing them.

The present application is a continuation-in-part of my copending applications, Serial Number 432,528 filed February 26, 1942, and Serial Number 490,517 filed June 11, 1943, said applications being assigned to the assignee of the present invention.

The primary object of my invention is to provide a new series of compounds having the general formula $RSiCl_3$ where R is an alkyl radical having from 10 to 31 carbon atoms. Other objects and advantages of my invention will be apparent from the following description.

The general procedure for the preparation of the compositions of my invention involves the formation of the suitable Grignard reagent and the coupling of this silicon tetrachloride. In both of these operations as well as in the subsequent working up of the product, it is obvious from the nature of the reagents and the products that anhydrous materials should be used and that the conditions of operation be such that air and moisture are carefully excluded if the maximum yields are to be obtained. The alkyl chloride employed should be free of its corresponding alcohol and the solvents or diluents used should also be free of alcohol. For preparing the Grignard reagent either relatively pure magnesium or any one of the several magnesium alloys may be used. Since the Grignard reagent preparation involves a surface reaction the magnesium metal should be in a form such as will provide a reasonably large surface, preferably in the form of turnings. Stirring is required during the formation of the Grignard reagent to provide adequate mixing but it should not be so vigorous that the reaction nuclei are buffed off the magnesium particles and the reaction thereby impeded. Since this reaction is often difficult to start, it is advisable to preheat the magnesium turnings in a bit of iodine vapor or to initiate the reaction with a little ethyl bromide in ether. Once the reaction is initiated the heat of reaction will carry the reaction on at the reflux temperature of the ether. The alkyl chloride should be admitted at such a rate (relatively slow) that a gentle reflux is maintained. After all of the alkyl chloride has been admitted, it is good practice to stir for an additional hour or two while holding at reflux temperature. Finally, the agitation is stopped and the mixture allowed to stand for some time to permit settling and cooling to room temperature. Then the supernatant liquor is carefully siphoned to a closed dropping funnel on the coupling reactor.

In coupling the alkyl Grignard reagent prepared as described above with silicon tetrachloride, it is preferable to use the latter in excess in order to favor the monoalkyl derivative among the various distribution products obtained. In common with Grignard synthesis in general, vigorous stirring is employed to minimize localized reaction. Also, the Grignard reagent is admitted slowly into the silicon tetrachloride which is diluted with a solvent, such as ether. The diluent may be any liquid which may not react with the reagents or product but a hydrocarbon is preferred over ether inasmuch as the by-produced magnesium chloride is partially soluble in the ether and is solvated by it, making subsequent filtration more difficult. The actual coupling may be conducted at reflux temperature or at a reduced temperature, the latter being preferred. To obtain a reduced temperature, external cooling is necessary. When the addition of the Grignard reagent is completed, it is good practice to stir the mixture a few hours at reflux temperature to break up salt lumps which may occlude reagent or product. The product is filtered in any conventional manner that insures minimum exposure to the atmosphere. The filtrate, including salt cake rinsings, is fractionally distilled in vacuo to isolate the pure alkyl silicon trichlorides.

For a better understanding of my invention, reference should be had to the following examples which are included merely by way of illustration and not limitation.

EXAMPLE 1

Dodecyl silicon trichloride 95 parts (0.43 mol) of lauryl chloride $(C_{12}H_{25}Cl)$ dissolved in 68 parts (0.92 mol) of anhydrous ethyl ether were added slowly to 12.5 parts (0.51 mol) of magnesium turnings under 35 parts of ethyl ether. The latter was in a 3-necked glass flask provided with a stirrer, a condenser, and a dropping funnel, respectively. The addition of the chloride was accomplished through the dropping funnel. Reaction was initiated by the addition of a little bromide in ether. The addition of the chloride was such thereafter as to maintain a gentle reflux of the ether. After all the chloride had been admitted, the reaction mass was stirred for another hour with the temperature being held at reflux. The stirring was then stopped and the mixture allowed to stand to permit settling of the salt and cooling to room temperature. The supernatant liquor was then carefully siphoned into a closed dropping funnel on the coupling reactor which, likewise, was a 3-necked flask provided with the aforementioned funnel, a stirrer, and a condenser.

The Grignard reagent so produced was added to a twofold excess of 140 parts of silicon tetrachloride (0.83 mol) in 150 parts of benzene. The reaction mass was stirred for 3 hours and then heated to reflux temperature for another 3 hours with stirring being continued. The product was filtered and the filtrate was then fractionally distilled, yielding a fraction at 162–171° C. at 18 mm. in an amount corresponding to 67% of theory. An analysis of this fraction was as follows:

|  | Per cent C | Per cent H | Per cent Cl | Per cent Si |
|---|---|---|---|---|
| Found | 47.7 | 8.52 | 34.2 | 9.02 |
| Theory | 47.4 | 8.23 | 35.2 | 9.22 |

EXAMPLE 2

*Tetradecylsilicon trichloride*

Tetradecylsilicon trichloride ($C_{14}H_{29}SiCl_3$) was prepared in a manner similar to the preparation of the dodecylsilicon trichloride of Example 1 with the exception that the Grignard reagent which was prepared from myristyl bromide ($C_{14}H_{29}Br$) was diluted with ether to a relatively low concentration prior to coupling with silicon tetrachloride. The crude coupling product was directly distilled and a fraction collected in the range of 131–132° C. at 0.8 mm. This fraction was identified by analysis as $C_{14}H_{29}SiCl_3$. The yield was 50% of the theoretical.

EXAMPLE 3

*Octadecylsilicon trichloride*

Octadecylsilicon trichloride was likewise prepared in a manner similar to that described in Example 1. The Grignard reagent was made from pure stearyl bromide ($C_{18}H_{37}SiBr$). An ether solution containing 3.54 mols of the Grignard reagent was slowly introduced into a coupling reactor containing 7.3 mols of silicon tetrachloride and 1.5 liters of benzene. The coupling product was filtered in the usual manner and the filtrate fractionally distilled in vacuo. A fraction boiling at 159 to 162° C. at 13 mm was identified by analysis to be $C_{18}H_{37}SiCl$. Its density was 0.95 g./cc. at 22° C.

In general, the monoalkylsilicon trichlorides are useful for rendering normally non-water repellent surfaces water repellent. They are particularly efficacious in the waterproofing of glass and ceramic materials, but may also be used in the treatment of cellulose fabrics such as cotton. I have found that the series of compounds of the present invention, namely, those having the general formula $RSiCl_3$ where R is an alkyl radical having from 10 to 31 carbon atoms are outstanding in their waterproofing effectiveness.

I have also discovered that this series of compounds possess the additional property of being extremely effective lubricating agents for glass. The latter property in combination with that of waterproofing adapts them for use in the production of glass yarn from glass fibers. As glass fibers are formed they possess great strength which, however, decreases rapidly upon exposure to moisture. Accordingly it is desirable to protect their surfaces as soon as possible from the effects of moisture. From 100 to 400 fibers are bound together to form strands which are wound on packages in such a manner that the strands can be unwound and processed thereafter in the conventional textile machines. To facilitate the binding of the fibres into strands a "binding fluid" is employed which serves to stick the fibers together while at the same time lubricating them against themselves and against abrasion from fabricating equipment. The compounds of my invention not only serve to "waterproof" the glass fibers but also to bind and to lubricate to the proper degree the fibers during their formation into strands.

I claim:

1. A composition of matter having the general formula $RSiCl_3$ wherein R is an alkyl radical having from 10 to 31 carbon atoms.

2. A composition of matter having the general formula $RSiCl_3$ wherein R is an alkyl radical having from 12 to 18 carbon atoms.

3. Octadecylsilicon trichloride.

4. Dodecylsilicon trichloride.

5. Tetradecylsilicon trichloride.

JAMES FRANKLIN HYDE.